US012234681B2

(12) United States Patent
Sripathi et al.

(10) Patent No.: US 12,234,681 B2
(45) Date of Patent: Feb. 25, 2025

(54) CONTACTLESS OPERATION OF LAVATORY DOORS

(71) Applicant: B/E AEROSPACE, INC., Winston Salem, NC (US)

(72) Inventors: Nagaraju Sripathi, Kattigenahalli (IN); Rajesh Vasudevan Nair, Sidedahalli (IN); Kannan Chidambaram Seetharaman, Bangalore (IN)

(73) Assignee: B/E AEROSPACE, INC., Winston-Salem, NC (US)

( * ) Notice: Subject to any disclaimer, the term of this patent is extended or adjusted under 35 U.S.C. 154(b) by 0 days.

(21) Appl. No.: 18/407,113

(22) Filed: Jan. 8, 2024

(65) Prior Publication Data

US 2024/0183212 A1    Jun. 6, 2024

Related U.S. Application Data

(62) Division of application No. 17/375,768, filed on Jul. 14, 2021, now Pat. No. 11,866,984.

(30) Foreign Application Priority Data

Jul. 14, 2020    (IN) .............................. 202041029939

(51) Int. Cl.
*E05F 15/00* (2015.01)
*B64C 1/14* (2006.01)
(Continued)

(52) U.S. Cl.
CPC ............ *E05F 15/73* (2015.01); *B64C 1/1423* (2013.01); *E05B 65/0035* (2013.01);
(Continued)

(58) Field of Classification Search
CPC ..... E05F 15/73; E05F 15/70; E05F 2015/765; E05F 15/75; E05Y 2400/44;
(Continued)

(56) References Cited

U.S. PATENT DOCUMENTS 3,012,837 A    12/1961   Morrissey, Jr.
4,994,722 A    2/1991    Dolan et al.
(Continued)

FOREIGN PATENT DOCUMENTS

EP    3480620 A1    5/2019

OTHER PUBLICATIONS

Partial European Search Report for European Patent Application No. 21185648.9, dated Dec. 7, 2021.
(Continued)

*Primary Examiner* — Chi Q Nguyen
(74) *Attorney, Agent, or Firm* — SNELL & WILMER L.L.P.

(57) ABSTRACT

A system for contactless operation of an aircraft lavatory door comprises a controller operatively connected to control an actuator for opening and closing a lavatory door. A gesture sensing system is operatively connected to the controller for sending gesture data to the controller indicative of a user gesturing for the actuator to actuate. A mmWave radar sensing system is operatively connected to the controller to indicate user presence. The controller includes machine readable instructions configured to verify gesture input from the gesture sensing system using input from the mmWave radar sensing system before controlling the actuator to open or close the lavatory door.

7 Claims, 7 Drawing Sheets

(51) Int. Cl.
*E05B 65/00* (2006.01)
*E05F 15/73* (2015.01)
*G08B 21/04* (2006.01)

(52) U.S. Cl.
CPC ...... *G08B 21/043* (2013.01); *E05F 2015/765* (2015.01); *E05Y 2400/44* (2013.01); *E05Y 2400/45* (2013.01); *E05Y 2400/86* (2013.01); *E05Y 2800/25* (2013.01); *E05Y 2900/502* (2013.01)

(58) Field of Classification Search
CPC ............. E05Y 2400/00; E05Y 2400/45; E05Y 2400/86; E05Y 2400/856; E05Y 2800/25; E05Y 2900/502; B64C 1/1423; E05B 65/0035; G08B 21/043
See application file for complete search history.

(56) References Cited

U.S. PATENT DOCUMENTS

| | | | |
|---|---|---|---|
| 6,570,498 B1 | 5/2003 | Frost et al. | |
| 8,169,317 B2 | 5/2012 | Lemerand et al. | |
| 8,720,827 B2 | 5/2014 | Boren | |
| 8,888,045 B2 | 11/2014 | Boren et al. | |
| 9,045,232 B1 | 6/2015 | Burke et al. | |
| 10,017,968 B2 | 7/2018 | Seibt et al. | |
| 10,151,135 B2 | 12/2018 | Shen | |
| 10,356,372 B2 | 7/2019 | Shen | |
| 11,129,502 B1 | 9/2021 | Jalbert | |
| 11,866,984 B2 * | 1/2024 | Sripathi | ................. B64C 1/1407 |
| 2005/0073425 A1 | 4/2005 | Snell et al. | |
| 2010/0253516 A1 | 10/2010 | Lemerand et al. | |
| 2011/0047876 A1 | 3/2011 | Houser et al. | |
| 2011/0080252 A1 | 4/2011 | Ibsies | |
| 2012/0119521 A1 * | 5/2012 | Lehr | ....................... E05B 17/10 |
| | | | 292/201 |
| 2014/0196372 A1 * | 7/2014 | Boren | ..................... E05F 15/73 |
| | | | 49/31 |
| 2014/0267739 A1 | 9/2014 | Ibsies | |
| 2015/0300054 A1 | 10/2015 | Seibt et al. | |
| 2018/0209185 A1 * | 7/2018 | Long | ..................... B64D 11/02 |
| 2018/0209203 A1 | 7/2018 | Shen | |
| 2019/0033978 A1 | 1/2019 | Eijkelenboom | |
| 2020/0164988 A1 | 5/2020 | Alvarez | |
| 2020/0204541 A1 | 6/2020 | Nair et al. | |
| 2020/0254122 A1 | 8/2020 | Starkweather et al. | |
| 2020/0300001 A1 * | 9/2020 | Chadwell | ............ E05B 47/0002 |
| 2021/0363798 A1 | 11/2021 | Subramanian et al. | |
| 2021/0363811 A1 | 11/2021 | Subramanian et al. | |

OTHER PUBLICATIONS

Extended European Search Report for European Patent Application No. 21185648.9, dated Mar. 11, 2022.

European Patent Office, European Office Action dated Feb. 21, 2024 in Application No. 21185648.9.

* cited by examiner

CONTACTLESS OPERATION OF LAVATORY DOORS

CROSS-REFERENCE TO RELATED APPLICATIONS

This application claims priority to and the benefit of U.S. Non-Provisional application Ser. No. 17/375,768, filed Jul. 14, 2021, now U.S. Pat. No. 11,866,984, the entire contents of which are herein incorporated by reference in their entirety, which claims priority to, and the benefit of, Indian Provisional Patent Application No. 202041029939 filed Jul. 14, 2020, the entire content of which is incorporated herein by reference.

BACKGROUND

1. Field

The present disclosure relates generally to lavatory doors, and more particularly to lavatory doors for aircraft interiors.

2. Description of Related Art

Lavatory systems must include certain features to be compliant for certification, for example, the lavatory must offer a certain amount of privacy and be accessible to all users including those in wheelchairs. Conventional lavatory systems include a series of foldable doors, each having a door lock and latch assembly, which allows the occupant to lock the door. However, requiring the door lock and latch assembly to be operated by hand can create a high touch point surface, which can transmit pathogens from one user to another, creating a safety and health concern to users of the lavatory system.

While some solutions have been suggested for contactless operation of aircraft lavatory doors, most use traditional motion sensing methodologies which are prone to false triggers. Camera based solutions may provide better accuracy than passive infrared (PIR) or ultrasonic sensors, but are not particularly appealing for lavatory applications due to privacy concerns they raise.

The conventional techniques have been considered satisfactory for their intended purpose. However, there is an ever present need for improved systems and methods for touch free operation of lavatory door systems. This disclosure provides a solution for this need.

SUMMARY

A system for contactless operation of an aircraft lavatory door comprises a controller operatively connected to control an actuator for opening and closing a lavatory door. A gesture sensing system is operatively connected to the controller for sending gesture data to the controller indicative of a user gesturing for the actuator to actuate. A mmWave radar sensing system is operatively connected to the controller to indicate user presence. The controller includes machine readable instructions configured to verify gesture input from the gesture sensing system using input from the mmWave radar sensing system before controlling the actuator to open or close the lavatory door.

The door is operatively connected to the actuator between the lavatory door and a door frame, the actuator operative to move the lavatory door between an open and closed position with actuation of the actuator. A lavatory compartment is on an inside of the door, and an exterior space is on an outside of the door such that the lavatory door opens into the lavatory compartment in the open position and provides a barrier between the inside compartment and the exterior space in the closed position.

A latch mechanism having a latch actuator operatively connected to the controller and the latch mechanism can be included to be operative to move the latch mechanism between a latched and unlatched position. The latched position maintains the lavatory door in the closed position, and the unlatched position allows for moving the door to the open position.

In embodiments, the gesture sensing system can include a first gesture sensor on an exterior of the lavatory door to sense a user gesturing outside of a lavatory compartment for the actuator to actuate, and a second gesture sensor on an interior of the lavatory door to sense a user gesturing inside the lavatory compartment for the actuator to actuate.

In embodiments, the mmWave radar sensing system can include a first mmWave sensor on an exterior of the lavatory door to sense user presence outside a lavatory compartment, and a second mmWave sensor on an interior of the lavatory door to sense user presence inside the lavatory compartment.

In certain embodiments, a human-machine-interface (HMI) can be operatively connected to the controller to indicate to a user at least one of: whether the user gesture performed is recognized or unrecognized, whether the user is blocking the lavatory door from closing, and/or whether the lavatory compartment is occupied. In certain embodiments, a manual override can be operatively connected to the controller to allow for manual opening of the door and/or latch system.

In certain embodiments, a system for contactless operation of an aircraft lavatory door can include, contactless means for determining user presence; contactless means for determining user gesture; a data processing module operatively connected to receive input from the contactless means; and a control module operatively connected to the data processing module to actuate the lavatory door based on the processed data.

A lavatory compartment and the lavatory door are included such that the lavatory door provides means for separation between an exterior and an interior of the lavatory compartment. The lavatory door can have actuating means operatively connected to the control module, and latching means can be operatively connected to the control module to latch and unlatch the lavatory door.

In embodiments, each of the contactless means for determining user presence and the contactless means for determining user gesture can be positioned on both the exterior of the lavatory compartment and on the interior of the lavatory compartment. In embodiments, the control module includes means for performing a method, the method including actuating the lavatory door and actuating the latch based on the processed data.

In certain embodiments, the method performed by the control module is the same for processed data that is received from the exterior contactless means versus the processed data that is received from the interior contactless means. In certain embodiments, the method performed by the control module is different for the processed data that is received from the exterior contactless means versus the processed data that is received from the interior contactless means.

A method for contactless operation of an aircraft lavatory door includes, receiving user presence input from a mmWave sensor; processing range, position, and/or velocity of the user; receiving gesture input from a gesture sensor;

actuating a latch actuator operatively connected to a latch mechanism to drive the latch mechanism between a latched and unlatched position to latch and unlatch the lavatory door based on the input from the gesture sensor and the mmWave sensor; and actuating an door actuator to move the lavatory door between an open and closed position.

The gesture sensor can be an exterior sensor operatively connected to a controller to provide input to the controller based on a user outside the lavatory door. The gesture sensor can be an interior sensor operatively connected to a controller to provide input to the controller based on a user inside the lavatory door. In certain embodiments, each of the mm Wave sensor and gesture sensor can both be an exterior sensors, and the method can include querying if a user is proximate the exterior mmWave sensor, and if a user is detected, waiting until the user performs a known gesture. If a known gesture is detected, the method can include actuating the latch actuator to unlatch the lavatory door and actuating the door actuator moving the lavatory door to the open position. If no known gesture is detected, the method can include indicating on an HMI that the gesture is not recognized and waiting until the user performs a known gesture.

In certain embodiments, a position sensor can be disposed in a door frame, where the method further includes querying whether the user is in the door frame, and if the user is detected in the door frame, indicating on the HMI that the user is blocking the lavatory door, and holding the door in the open position and waiting a threshold period of time before issuing an alert to the user. Otherwise, if no user is detected in the door frame, the method can include actuating the door actuator moving the lavatory door to the closed position.

In certain embodiments, each of the mmWave sensor and the gesture sensor can be interior sensors, the method can include querying if a user is proximate the interior mmWave sensor. If a user is detected, the method includes waiting until the user performs a known gesture. If a known close gesture is detected, the method can include actuating the door actuator moving the lavatory door to the closed position and actuating the latch actuator to latch the lavatory door. If a known open gesture is detected, the method can include actuating the latch actuator to unlatch the lavatory door and actuating the door actuator moving the lavatory door to the open position. If a known open gesture is detection, and if the door is latched, the method displaying on the HMI a an indicator that the lavatory door is latched.

If no known gesture is detected, the method includes checking for presence of the user. If after checking for presence of the user, no presence is detected, the method can include issuing an alert to the user for a threshold amount of time. If after the threshold amount of time, presence of the user is detected, the method can include maintaining the door in the latched position, and taking no further action until a known open gesture is detected. If after the threshold amount of time, presence of the user is not detected, issuing an alert to a third party.

The method can also include processing range, position, and/or velocity of the user, determining whether the user has fallen. If the user has fallen, the method can include sending an alert to a third party. Otherwise, the method can include waiting for a timeout threshold to re-check for presence or re-check if the user has fallen.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
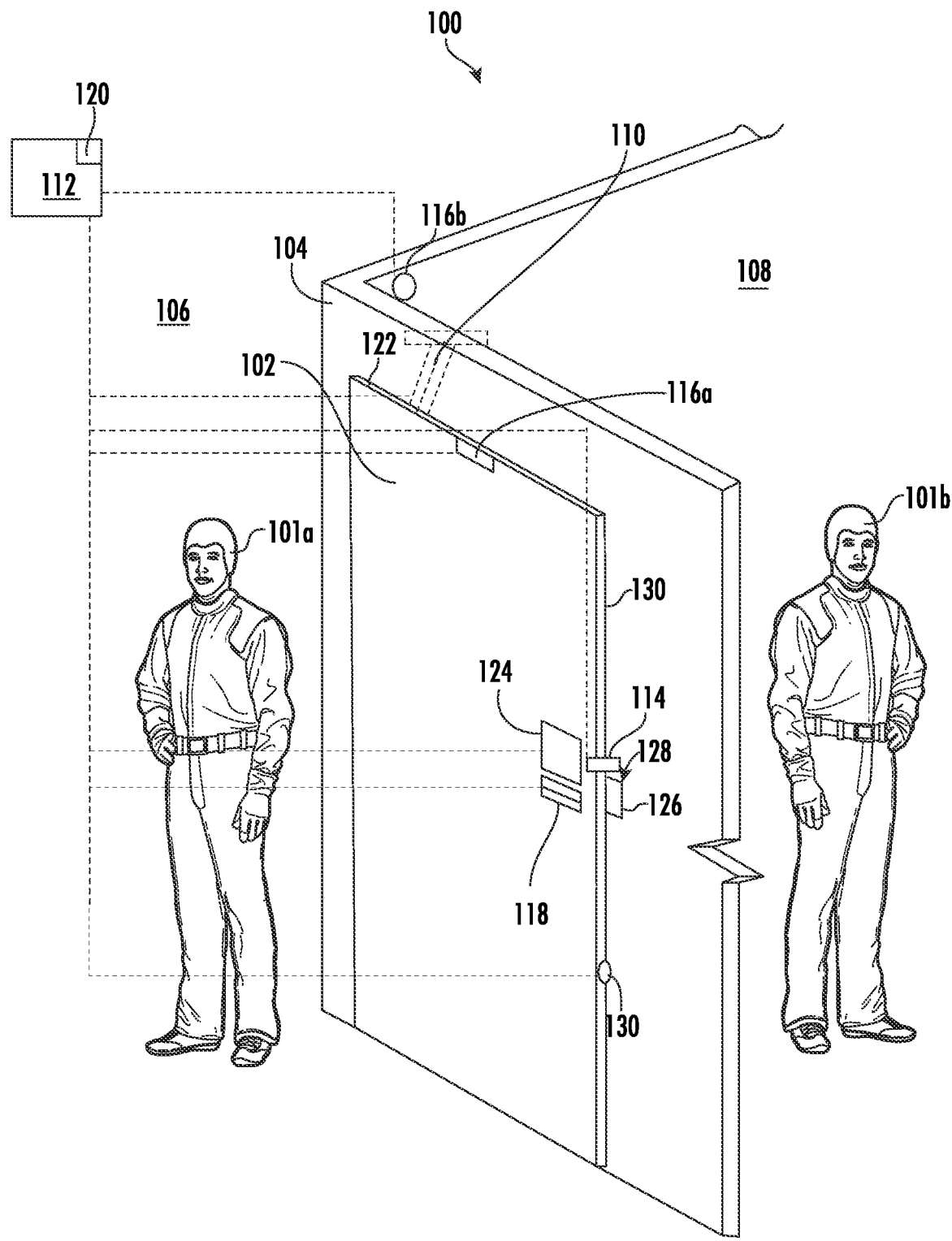
FIG. 1 is a schematic perspective view of an embodiment of a door system constructed in accordance with the present disclosure, showing user interaction with the door system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used to provide touch free operation of lavatory doors.

Figure 2:
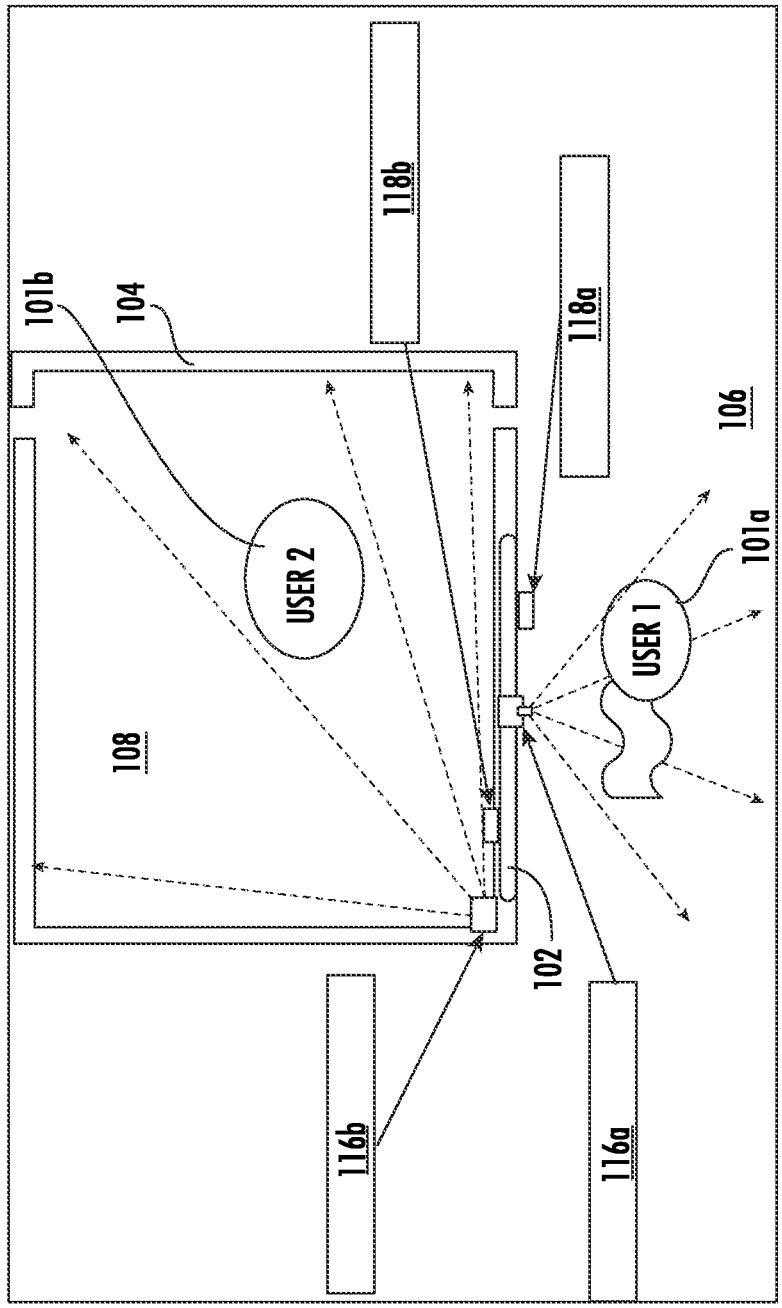
FIG. 2 is a schematic overhead view of the door system of FIG. 1.

As shown in FIGS. 1 and 2, a system 100 for contactless operation of an aircraft lavatory door 102 can include, a lavatory compartment 104 and the lavatory door 102, where the lavatory door 102 provides means for separation between an exterior 106 and an interior 108 of the lavatory compartment 104. The lavatory door 102 can have actuating means 110 operatively connected to a control module 112 to open and close the lavatory door 102, and latching means 114 connected to the control module 112 to latch and unlatch the lavatory door 102.

Contactless means for determining user presence 116 and contactless means for determining user gesture 118 can be included on either one or both of the exterior 106 of the lavatory compartment 104 and/or the interior 108 of the lavatory compartment 104. A data processing module 120 is operatively connected to receive input from both contactless means 116, 118, and the control module 112 is operatively connected to the data processing module 120 to actuate the lavatory door 102 and latching means 114 based on the processed data.

In certain embodiments, the control module 112 includes means for performing a method, for example actuating the lavatory door 104 and actuating the latch 114 based on the processed data. For the purposes of example and explanation, and not for limitation, the above referenced means will be discussed in further detail below, however it will appreciated by those skilled in the art that the disclosed means do not represent an exhaustive list, and any suitable means, or combination thereof for a respective function may be used or included without departing from the scope of this disclosure.

In operation, the lavatory door 102 is operatively connected to the actuating means 110 between the lavatory door 102 and a door frame 122. The actuating means 110 is operative to move the lavatory door 102 between an open and closed position with actuation of the actuator 110, such that the lavatory door opens into the interior 108 lavatory compartment 104 in the open position and provides a privacy barrier between the interior 108 and the exterior space 106 in the closed position. The actuating means 110 can include any suitable actuator and driver 111, such as a pneumatic actuator, a worm gear system, a cable and/or pulley system, or the like. While described herein as opening into the lavatory compartment, it should be understood that the lavatory door 102 can open in any suitable manner, including for example, opening outward into the exterior space 106, or folding along a center hinge line so that the lavatory door moves and folds laterally in track in the door frame. Multi panel lavatory doors, and doors having biasing hinges are also contemplated herein.

The latching means 114 can include both of a latch mechanism 114 and a latch actuator 111 operatively connected to the controller 112, the latch actuator 114 operative to move the latch mechanism 114 between a latched and unlatched position. The latched position maintains the lavatory door 102 in the closed position, and the unlatched position allows for moving the door 12 to the open position. The latch mechanism 114 can include a sliding lock for example, that is actuated via the latch actuator/driver 111 upon closure of the lavatory door 102. However, it is also contemplated that the door actuator 110 can either be, or can additionally include therein, the latching mechanism 114. For example, in certain embodiments, once the lavatory door 102 is in the closed position, the door actuator 110 can lock in place in any suitable manner to prevent the door 102 from moving to the open position without the proper command or the driver 111 can be operative to drive both the door actuator 110 and the latch actuator simultaneously.

The contactless means for determining user presence 116 can include a mmWave radar sensing system operatively connected to the controller 112 to indicate user presence. The contactless means for determining user gesture 118 can be a gesture sensing system having any suitable sensing system, including, but not limited to, infrared sensors, ultrasound sensors, and the like, operatively connected to the controller for sending gesture data to the controller 112 indicative of a user gesturing for the actuator 110 to actuate. Recognized gestures may include, for example, waving a hand in front of the sensor 118 from left to right, however gestures be customized and pre-programmed and may be changed as needed or desired (e.g. based on requirements from the airlines). Both of the mmWave radar sensing system 116 and the gesture sensing system 118 can include a first and second respective sensors, for example an exterior mmWave sensor 116a, an interior mmWave sensor 116b, an exterior gesture sensor 118a, and an interior gesture sensor 118b.

In certain embodiments, a human-machine-interface (HMI) 124 can be operatively connected to the controller to provide visual feedback to the user to indicate at least one of: whether the user gesture performed is recognized or unrecognized, whether the user is blocking the lavatory door 102 from closing, and/or whether the lavatory compartment 104 is occupied. The human-machine-interface 124 can include any suitable user interface, for example a graphical user interface, an LCD screen, an audio interface, or the like. In certain embodiments, a manual override 126 can be operatively connected to the controller 112 to allow for manual opening of the door (e.g. an override handle, toggle, or the like in the lavatory) and/or latch system in case of an emergency, or in the event of a failed sensor or actuator. The manual override 126 can include any suitable override, including an electronic override that utilizes the existing electronics to open or close the lavatory door upon the override command. This override may be suitable for when a user needs assistance inside the lavatory compartment 104 and is unable to open the lavatory door, but the sensors and actuators are otherwise functional. The manual override 126 may be a mechanical override, for example manually opening the lavatory door by a user physically moving the lavatory door (e.g. by removing an access panel 128 to access the door components). This override may be suitable if any one of the electronics components fail or are faulty and electronic opening of the lavatory door 104 is not possible.

Figure 3:
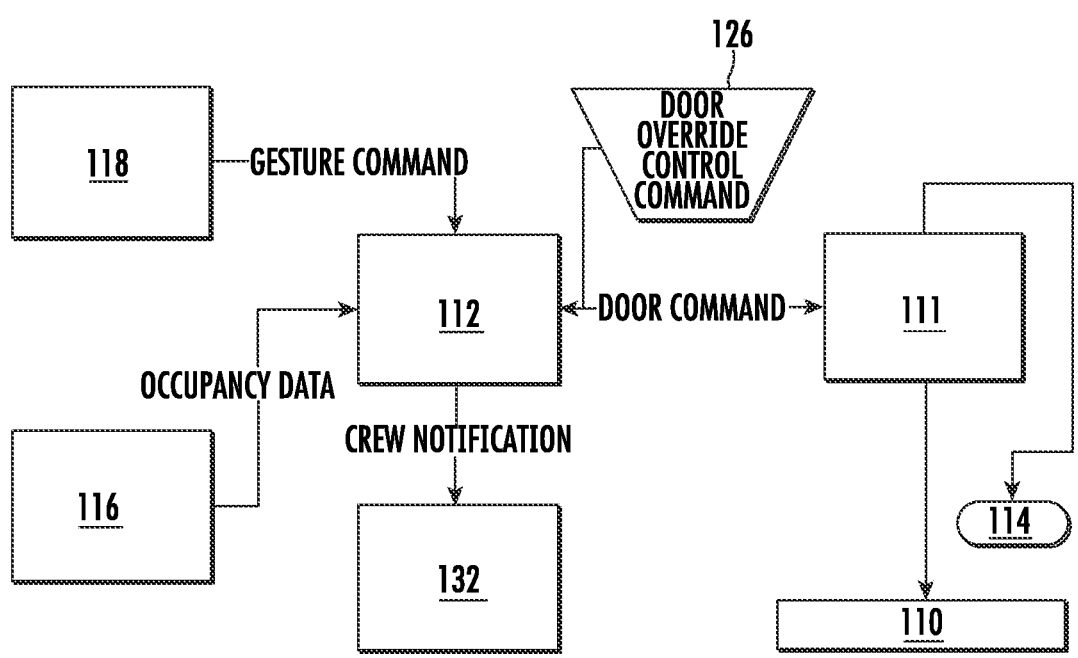
FIG. 3 is a schematic flow diagram showing operation of the door system of FIG. 1.

As shown in FIG. 3, the control module 112 includes the controller operatively connected to control the actuating means 110, for example by executing computer readable instructions stored in a storage medium within the controller 112. The machine readable instructions can also include instructions to cause the controller to perform a method, for example, actuating the lavatory door actuating means 110 and actuating the latching mechanism 114 based on the processed data from the data processing module 120. The data processing module 120 may be within the control module 112 (e.g. as shown), or separate therefrom. The machine readable instructions can be configured to verify gesture input from the gesture sensing system 118 using input from the mmWave radar sensing system 116 before controlling the actuator 110 to open or close the lavatory door 102.

In certain embodiments, the method performed by the controller 112 is the same for processed data that is received from the exterior sensors 116a, 118a versus the processed data that is received from the interior sensors 116b, 118b. However, it is also possible that the method performed by the controller is different for the processed data that is received from the exterior sensors 116a, 118a versus the processed data that is received from the interior sensors 116b, 118b. As described below, the machine readable instructions provide for a number of different methods, depending on the input received from the numerous sensors within the system 100.

Turning to FIGS. 4-7, the method for contactless operation of the aircraft lavatory door 102 can include receiving user presence input from the mmWave sensor 116a, 116b; processing range, position, and/or velocity of the user; receiving gesture input from the gesture sensor 118a, 118b; actuating the latching means 114 based on the input from the gesture sensor and the mmWave sensor; and actuating the door actuating means 110 to move the lavatory door 102 between an open and closed position.

Figure 4:
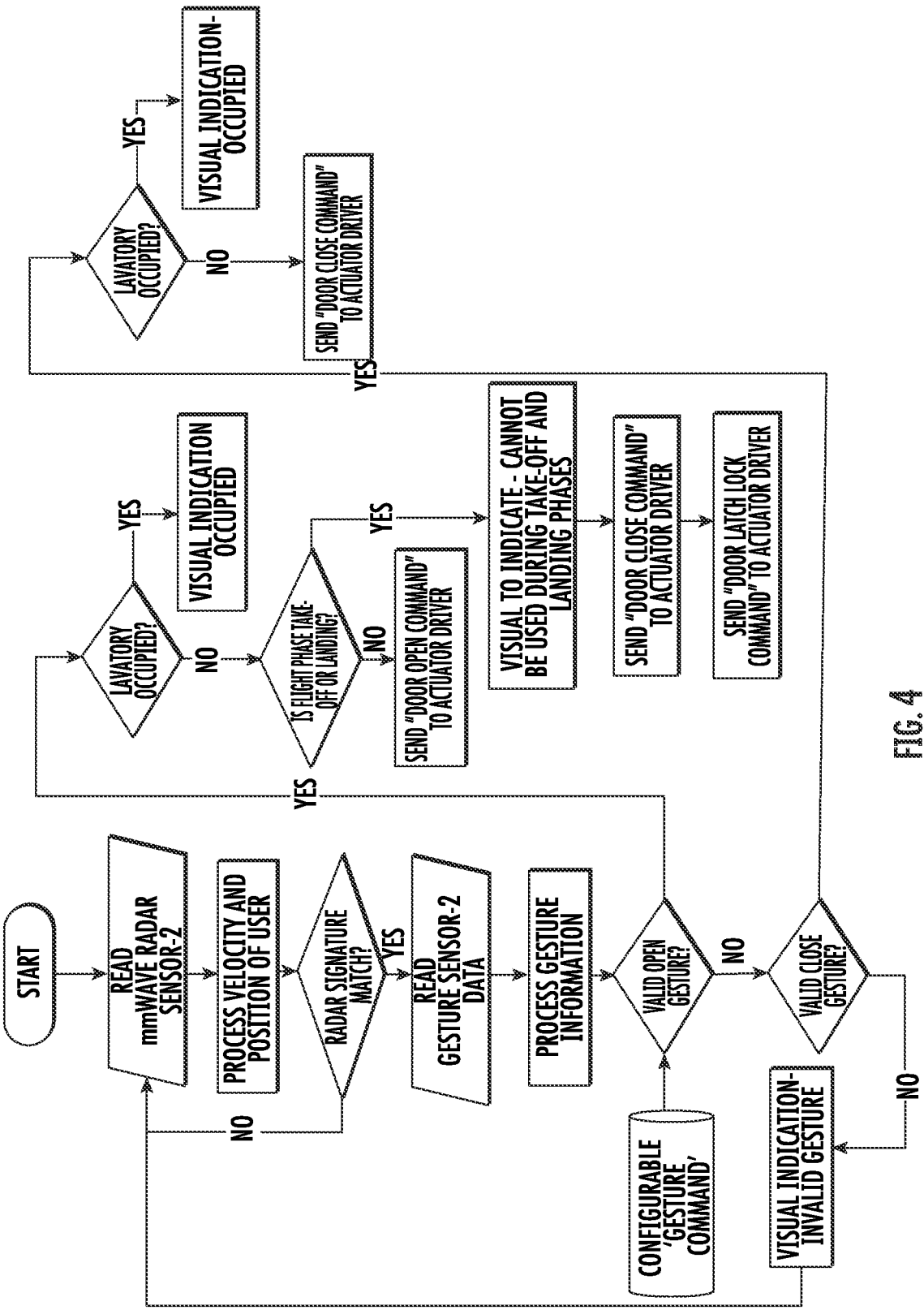
FIG. 4 is a schematic flow diagram showing a control algorithm constructed in accordance with at least one aspect of the present disclosure.

Shown in FIG. 4, in certain embodiments, each of the mmWave sensor 116a and gesture sensor can 118a both be an exterior sensors, and the method can include querying if a user 101a is proximate the exterior mmWave sensor 116a, and if a user 101a is detected, waiting until the user 101a performs a known gesture. If a known gesture is detected, the method can include actuating the latch actuator 114 to unlatch the lavatory door 102 and actuating the door actuator 110 moving the lavatory door 102 to the open position. If no known gesture is detected, the method can include indicating on an HMI 124 that the gesture is not recognized and waiting until the user 101a performs a known gesture. If a known open gesture is detected, and if the door 102 is already latched, the method can include displaying on the HMI 124 an indicator that the lavatory door 102 is latched and the lavatory compartment 104 is currently occupied.

In certain embodiments, a position sensor 130 can be disposed in a door frame 122 (e.g. as shown in FIG. 1), where the method further includes querying whether the user 101a is in the door frame 122, and if the user 101a is detected in the door frame 122, indicating on the HMI 124 that the user is blocking the lavatory door 102, and holding the door 102 in the open position and waiting a threshold period of time before issuing an alert to the user 101a. Otherwise, if no user is detected in the door frame 122, the method can include actuating the door actuator 110 moving the lavatory door 102 to the closed position.

Figure 5:
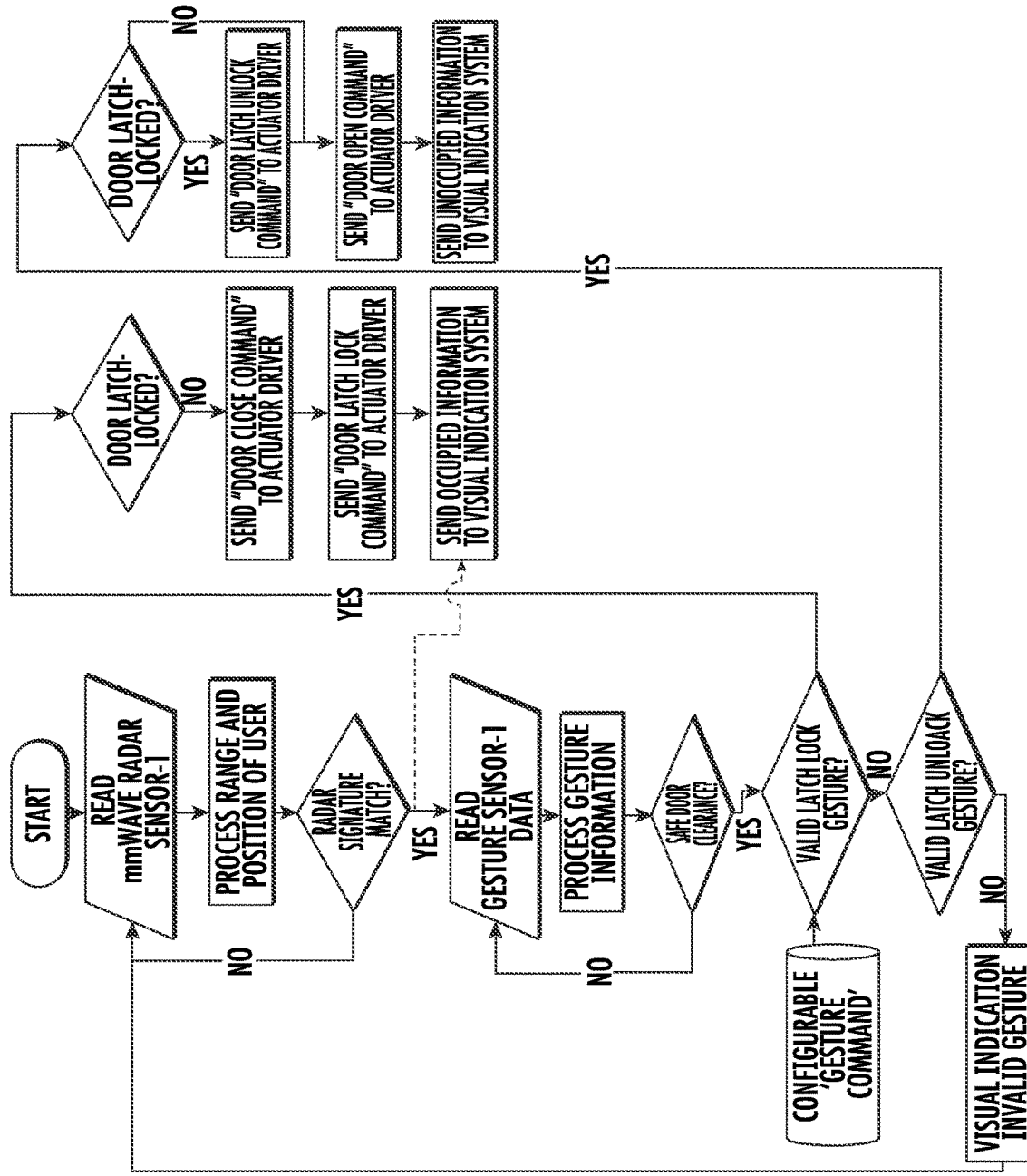
FIG. 5 is a schematic flow diagram showing another control algorithm constructed in accordance with at least one aspect of the present disclosure.

As shown in FIG. 5, in certain embodiments, each of the mmWave sensor 116b and the gesture sensor 118b can be interior sensors, the method can include querying if a user 101b is proximate the interior mmWave sensor 116b. If a user 101b is detected, the method includes waiting until the user 101b performs a known gesture. If a known close gesture is detected, the method can include actuating the door actuator 110 moving the lavatory door 102 to the closed position and actuating the latch actuator 114 to latch the lavatory door 102. If a known open gesture is detected, the method can include actuating the latch actuator 114 to unlatch the lavatory door 102 and actuating the door actuator 110 moving the lavatory door 102 to the open position.

Figure 6:
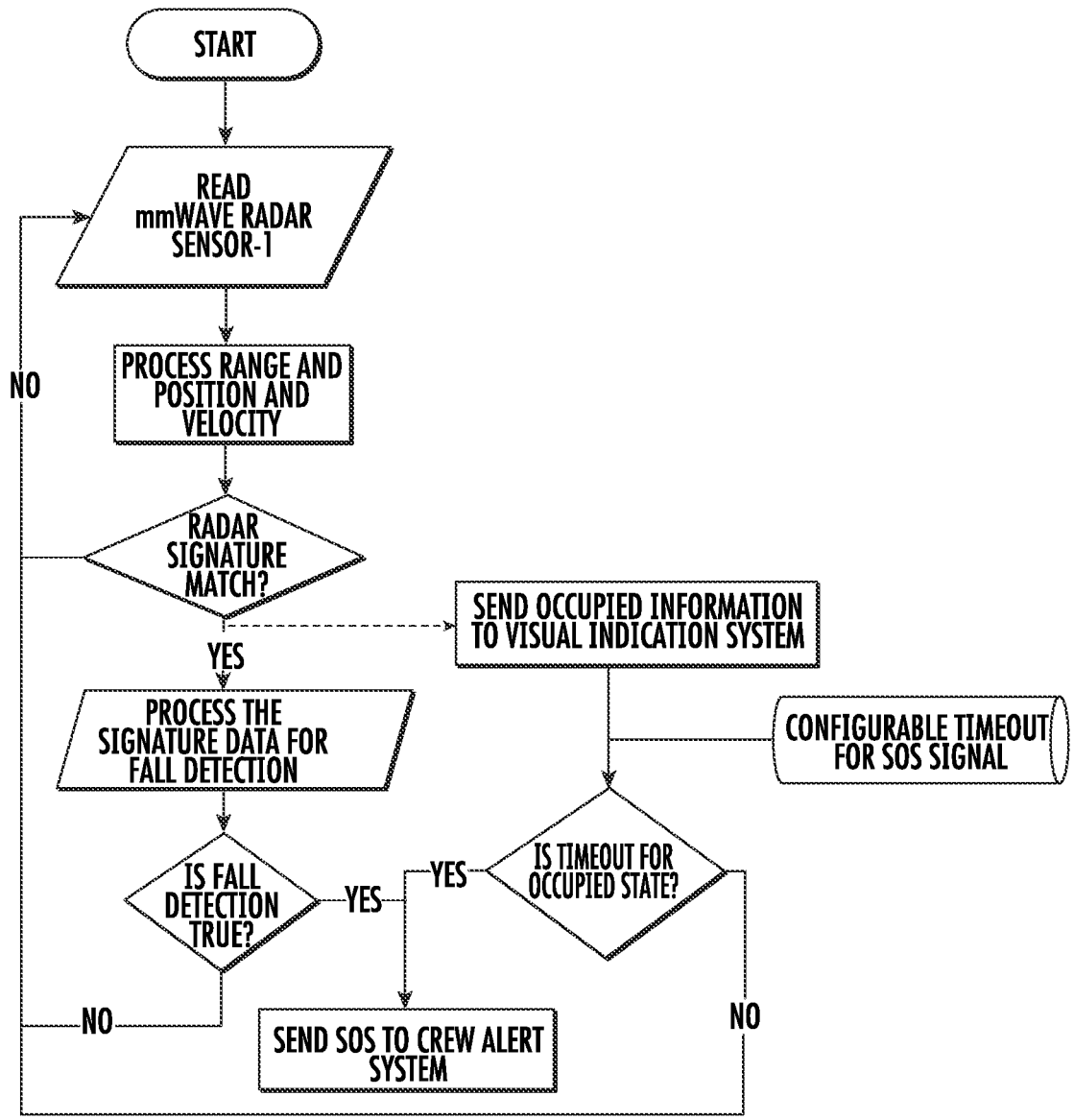
FIG. 6 is a schematic flow diagram showing another control algorithm constructed in accordance with at least one aspect of the present disclosure.

Turning now to FIG. 6, if the lavatory compartment 104 is occupied, if no known gesture is detected, the method includes checking for presence of the user 101b. If after checking for presence of the user 101b, no presence is detected, the method can include issuing an alert 132 to the user 101b or a crew member for a threshold amount of time. If after the threshold amount of time, presence of the user 101b is detected, the method can include maintaining the door 102 in the latched position, and taking no further action until a known open gesture is detected. If however, after the threshold amount of time, presence of the user 101b is still not detected, the method can include issuing an alert to a third party (e.g. designated crew members).

Figure 7:
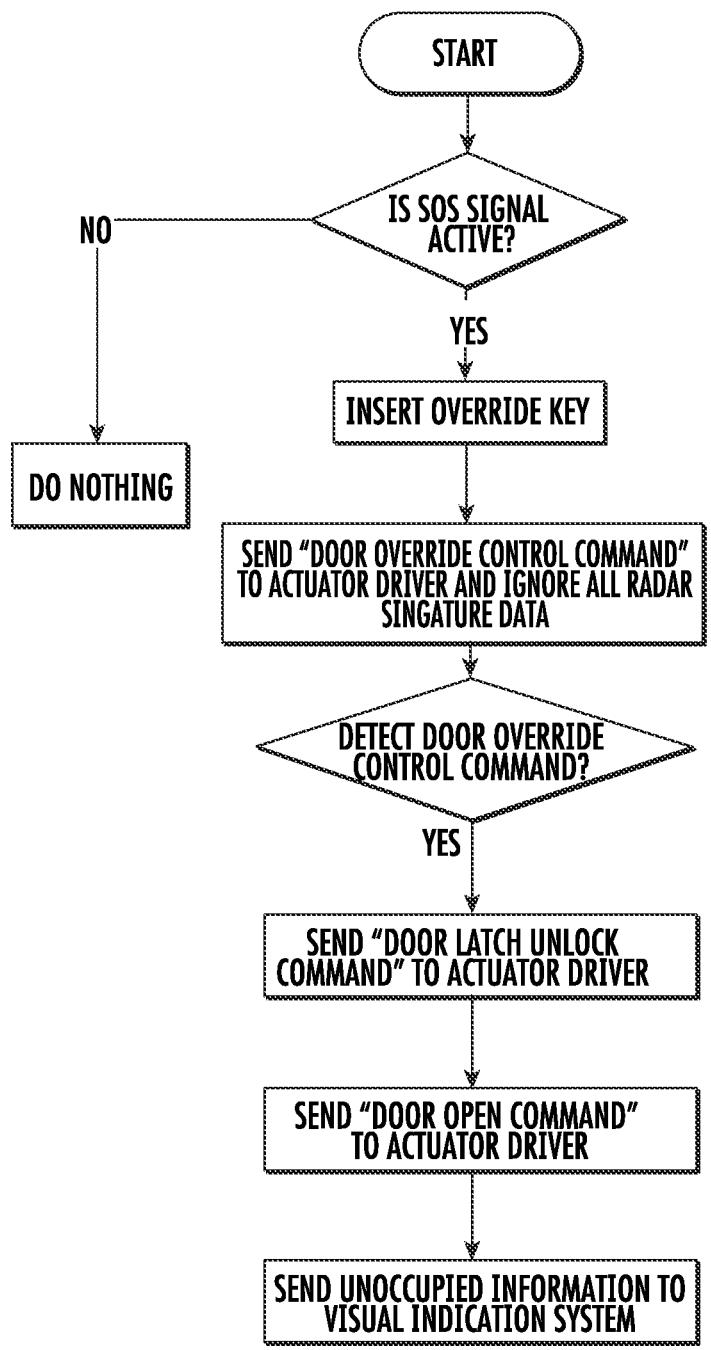
FIG. 7 is a schematic flow diagram showing another control algorithm constructed in accordance with at least one aspect of the present disclosure.

In certain embodiments, such as in FIG. 7, the method can also include processing range, position, and/or velocity of the user 101b, and determining whether the user 101b has fallen. If the user has fallen, the method can include sending an alert 132 to a third party (e.g. crew or emergency personnel). In that case, a crew member may then activate the manual override 126. Otherwise, the method can include waiting for a timeout threshold to re-check for presence or re-check if the user 101b has fallen.

The methods and systems of the present disclosure, as described above and shown in the drawings, provide for reduced physical contact between passengers which may lessen chances of contagious disease spread between passengers. Embodiments provide for determination of valid commands from both the valid gestures and radar signature data ensures no false triggering of the sensors, for example by a passenger walking by or a galley cart moving down the aisle or parked in front of the lavatory. Certain embodiments provide for additional passenger safety by notifying flight crew if a lavatory user has collapsed, become unconscious, or otherwise needs assistance so that crew may take medical action if necessary. Embodiments also ensure that lavatory access is prohibited during certain stages of flight where it may not be safe for passengers to use the lavatories, (e.g. takeoff, landing, and/or turbulence) by automatically locking the doors with a control override.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure. While the apparatus and methods of the subject disclosure have been shown and described, those skilled in the art will readily appreciate that changes and/or modifications may be made thereto without departing from the scope of the subject disclosure.

What is claimed is:

1. A method for contactless operation of an aircraft lavatory door, comprising;
    receiving user presence input from an exterior mm Wave sensor;
    querying whether a user is proximate the exterior mm Wave sensor;
    processing range, position, and/or velocity in response to the user being proximate;
    receiving a gesture input from an exterior gesture sensor;
    determining whether the gesture input is a known gesture;
    indicating on a human-machine-interface (HMI), in response to the gesture input not being the known gesture that the gesture is not recognized and waiting until the user performs the known gesture;
    actuating, in response to the gesture input being the known gesture, a latch actuator operatively connected to a latch mechanism to drive the latch mechanism between a latched and an unlatched position to latch and unlatch the aircraft lavatory door based on the input from the exterior gesture sensor and the exterior mm Wave sensor; and
    actuating, in response to the gesture input being the known gesture, a door actuator to move the aircraft lavatory door between an open and a closed position.

2. The method as recited in claim 1, wherein the exterior gesture sensor is operatively connected to a controller to provide input to the controller based on the user outside the aircraft lavatory door.

3. The method as recited in claim 1, further comprising a touchless sensor, wherein the touchless sensor is an interior sensor operatively connected to a controller to provide input to the controller based on a second user inside the aircraft lavatory door.

4. The method as recited in claim 1, wherein a position sensor is disposed in a door frame, the method further comprising:
    querying whether the user is in the door frame;

indicating on the HMI, in response to the user being detected in the door frame, that the user is blocking the aircraft lavatory door, and holding the door in the open position and waiting a threshold period of time before issuing an alert to the user; and actuating, in response to no user being detected in the door frame, the door actuator moving the aircraft lavatory door to the closed position.

5. The method as recited in claim 4, further comprising:

receiving a second user presence input from an interior mm Wave sensor;

querying if a second user is proximate the interior mm Wave sensor;

waiting, in response to the second user being proximate, until the second user performs a second known gesture, wherein i) if a known close gesture is detected, actuating the door actuator moving the aircraft lavatory door to the closed position and actuating the latch actuator to latch the aircraft lavatory door; or ii) if a known open gesture is detected, actuating the latch actuator to unlatch the aircraft lavatory door and actuating the extendible door actuator moving the aircraft lavatory door to the open position; and iii) if the door is latched, displaying on the HMI an indicator that the aircraft lavatory door is latched; or wherein if no known gesture is detected, checking for presence of the second user; and i) if after checking for the presence of the second user, no presence is detected, issuing an alert to the second user for a threshold amount of time.

6. The method as recited in claim 5, further comprising, if after the threshold amount of time, presence of the second user is detected, maintaining the door in the latched position, and taking no further action until the known open gesture is detected; or if after the threshold amount of time, presence of the second user is not detected, issuing a second alert to a third party.

7. The method as recited in claim 6, further comprising:

processing range, position, and velocity of the second user;

determining whether the second user has fallen; and if the second user has fallen, sending a third alert to a third party; or else, waiting for a timeout threshold to re-check for presence or re-check if the second user has fallen.

* * * * *